(12) United States Patent
Park et al.

(10) Patent No.: US 10,508,578 B2
(45) Date of Patent: Dec. 17, 2019

(54) ENGINE SYSTEM

(71) Applicants: HYUNDAI MOTOR COMPANY, Seoul (KR); KIA MOTORS CORPORATION, Seoul (KR)

(72) Inventors: Yeongseop Park, Seoul (KR); Dong Hee Han, Seoul (KR); Seungwoo Hong, Seoul (KR); Hyungbok Lee, Seongnam-si (KR); Jong Il Park, Seoul (KR); Joowon Lee, Gwangju-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 24 days.

(21) Appl. No.: 15/797,500

(22) Filed: Oct. 30, 2017

(65) Prior Publication Data

US 2018/0334941 A1    Nov. 22, 2018

(30) Foreign Application Priority Data

May 17, 2017  (KR) .................. 10-2017-0060826

(51) Int. Cl.
*F01N 13/08* (2010.01)
*F01N 3/20* (2006.01)
(Continued)

(52) U.S. Cl.
CPC ......... *F01N 3/2093* (2013.01); *F01N 3/0878* (2013.01); *F01N 3/101* (2013.01);
(Continued)

(58) Field of Classification Search
CPC .... F01N 2410/00; F02M 26/16; F02M 26/35; F02M 26/71
See application file for complete search history.

(56) References Cited

U.S. PATENT DOCUMENTS 10,094,337 B2 * 10/2018 Massard .............. F02D 41/005
2010/0179745 A1 *  7/2010 Nakayama .......... F02D 41/0072
                                                               701/108
(Continued)

FOREIGN PATENT DOCUMENTS

JP    2007291973 A  * 11/2007
JP    2016217286 A  * 12/2016
(Continued)

OTHER PUBLICATIONS

Machine translation of JP-2007291973-A, accessed Apr. 29, 2019. (Year: 2019).*

*Primary Examiner* — Jonathan R Matthias
(74) *Attorney, Agent, or Firm* — Morgan, Lewis & Bockius LLP (57) ABSTRACT

An engine system includes: an engine including a plurality of combustion chambers generating driving torque by combustion of fuel; an exhaust gas purification apparatus installed at an exhaust line in which exhaust gas exhausted from the combustion chambers flows; a bypass line branched from the exhaust line at an upstream side of the exhaust gas purification apparatus and joining the exhaust line at a downstream side of the exhaust gas purification apparatus so that the exhaust gas flowing in the exhaust line bypasses the exhaust gas purification apparatus; and a bypass valve installed at the bypass line.

4 Claims, 6 Drawing Sheets

(51) Int. Cl.
  *F01N 3/10* (2006.01)
  *F01N 3/08* (2006.01)
  *F02M 26/16* (2016.01)
  *F02M 26/21* (2016.01)
  *F02M 26/35* (2016.01)
  *F01N 9/00* (2006.01)

(52) U.S. Cl.
  CPC ............ *F01N 3/106* (2013.01); *F01N 3/206* (2013.01); *F01N 9/00* (2013.01); *F01N 13/087* (2013.01); *F02M 26/16* (2016.02); *F02M 26/21* (2016.02); *F02M 26/35* (2016.02); *F01N 2340/06* (2013.01); *F01N 2390/00* (2013.01); *F01N 2410/00* (2013.01); *F01N 2430/06* (2013.01); *F01N 2560/026* (2013.01); *F01N 2570/18* (2013.01); *F01N 2610/06* (2013.01)

(56) References Cited

U.S. PATENT DOCUMENTS

| | | | |
|---|---|---|---|
| 2014/0260242 A1* | 9/2014 | Chadwell | F02B 37/12 60/605.1 |
| 2015/0047346 A1* | 2/2015 | Styles | F02B 47/08 60/605.2 |
| 2016/0251012 A1* | 9/2016 | Schneider | B60W 20/16 701/22 |
| 2016/0281652 A1* | 9/2016 | Takasu | F02D 41/0065 |
| 2018/0170353 A1* | 6/2018 | Ulrey | B60W 20/15 |

FOREIGN PATENT DOCUMENTS

| | | |
|---|---|---|
| KR | 10-2015-0064052 A | 6/2015 |
| KR | 10-1546332 B1 | 8/2015 |
| KR | 10-2016-0070186 A | 6/2016 |

* cited by examiner

ENGINE SYSTEM

CROSS-REFERENCE TO RELATED APPLICATION

This application claims the benefit of priority to Korean Patent Application No. 10-2017-0060826 filed in the Korean Intellectual Property Office on May 17, 2017, the entire content of which is incorporated herein by reference.

TECHNICAL FIELD

The present disclosure relates to an engine system, and more particularly, to an engine system that may block oxygen from being intercalated in a catalyst of an exhaust gas purification apparatus under a fuel-cut condition.

BACKGROUND

Generally, exhaust gas flowing out through an exhaust manifold from an engine is introduced into a catalytic converter provided at an exhaust pipe and is purified therein. Then, noises of the exhaust gas are decreased while passing through a muffler and then the exhaust gas is discharged into the atmosphere through a tail pipe. The catalytic converter purifies pollutants contained in the exhaust gas.

A denitrification (DeNOx) catalyst is used in one type of such a catalytic converter, and purifies nitrogen oxides (NOx) contained in the exhaust gas. When reducing agents such as urea, ammonia, carbon monoxide, and hydrocarbons (HC) are supplied to the exhaust gas, the NOx contained in the exhaust gas is reduced by the DeNOx catalyst through an oxidation-reduction reaction with the reducing agents.

In order to decrease the nitrogen oxides, a three-way catalyst is used in a gasoline vehicle, and the three-way catalyst can simultaneously purify three harmful substances such as carbon monoxide, hydrocarbons, and nitrogen oxides by an oxidation-reduction reaction.

In the exhaust gas purifying apparatus such as the three-way catalyst, purification efficiency by a catalyst thereof is deteriorated when oxygen is intercalated in the catalyst under a fuel-cut condition as in coasting of a vehicle.

In order to solve this problem, when a fuel cut state is switched to a running state in which fuel is injected, fuel is injected so as to be richer than the stoichiometric air-fuel ratio, thereby purging the oxygen intercalated in the catalyst (this is referred to as catalyst purge). However, although the catalyst purge is performed, until the oxygen is purged, the purification efficiency of the catalyst is maintained in the deteriorated state, and thus, noxious exhaust gas may be discharged.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an engine system that may block oxygen from being intercalated in a catalyst while a vehicle runs in a fuel cut state.

An exemplary embodiment of the present disclosure provides an engine system including: an engine including a plurality of combustion chambers generating driving torque by combustion of fuel; an exhaust gas purification apparatus installed at an exhaust line through which exhaust gas exhausted from the combustion chambers flows; a bypass line branched from the exhaust line at an upstream side of the exhaust gas purification apparatus and joining the exhaust line at a downstream side of the exhaust gas purification apparatus so that the exhaust gas flowing in the exhaust line bypasses the exhaust gas purification apparatus; and a bypass valve disposed at the bypass line and operating according to an injection condition of fuel and be installed at the bypass line.

The engine system may further include a turbocharger including a turbine disposed at the exhaust line at an upstream side of the exhaust gas purification apparatus to be rotated by the exhaust gas and a compressor disposed at an intake line to be rotated together with the turbine, wherein the bypass line may be branched from the exhaust line between the exhaust gas purification apparatus and the turbine.

The bypass valve may be opened in a fuel-cut condition, so that the exhaust gas flowing in the exhaust line may bypass the exhaust gas purification apparatus.

The fuel-cut condition may be satisfied when a vehicle is coasting.

Another embodiment of the present disclosure provides an engine system including: an engine including a plurality of combustion chambers generating driving torque by combustion of fuel; an intake manifold distributing intake air supplied from an intake line to the plurality of combustion chambers; an exhaust gas purification apparatus installed at an exhaust line in which exhaust gas exhausted from the combustion chambers flows; a bypass line branched from the exhaust line at an upstream side of the exhaust gas purification apparatus and joined to the intake manifold so that the exhaust gas flowing in the exhaust line bypasses the exhaust gas purification apparatus; and a bypass valve configured to operate according to an injection condition of fuel and be installed at the bypass line.

The engine system may further include a turbocharger including a turbine disposed at the exhaust line at an upstream side of the exhaust gas purification apparatus to be rotated by the exhaust gas and a compressor disposed at an intake line to be rotated together with the turbine, wherein the bypass line may be branched between the exhaust gas purification apparatus and the turbine.

The bypass valve may be opened in a fuel-cut condition, so that the exhaust gas flowing in the exhaust line may flow from an upstream side of the exhaust gas purification apparatus to the intake manifold.

The fuel-cut condition may be satisfied when a vehicle is coasting.

Yet another embodiment of the present disclosure provides an engine system including: an engine including a plurality of combustion chambers generating driving torque by combustion of fuel; an intake manifold distributing intake air supplied from an intake line to the plurality of combustion chambers; a throttle valve installed at an upstream side of the intake manifold to adjust an amount of air supplied to the intake manifold; an exhaust gas purification apparatus installed at an exhaust line in which exhaust gas exhausted from the combustion chambers flows; and an exhaust gas recirculation apparatus including an exhaust gas recirculation (EGR) line branched from the exhaust line at an upstream side of the exhaust gas purification apparatus and joined to the intake manifold and an EGR valve installed at the EGR line, wherein in a fuel-cut condition, the EGR valve may be opened and the throttle valve is shut off, so that the exhaust gas flowing in the exhaust line may be supplied to the intake manifold along the EGR line.

The fuel-cut condition may be satisfied when a vehicle is coasting.

Yet another embodiment of the present disclosure provides an engine system including: an engine including a plurality of combustion chambers generating driving torque by combustion of fuel; an intake manifold distributing intake air supplied from an intake line to the plurality of combustion chambers; a throttle valve installed at an upstream side of the intake manifold to adjust an amount of air supplied to the intake manifold; an exhaust gas purification apparatus installed at an exhaust line in which exhaust gas exhausted from the combustion chambers flows; a turbocharger including a turbine disposed at the exhaust line at an upstream side of the exhaust gas purification apparatus to be rotated by the exhaust gas and a compressor disposed at an intake line to be rotated together with the turbine; an exhaust gas recirculation apparatus including an EGR line branched from the exhaust line between the exhaust gas purification apparatus and the turbine and joined to the intake line at an upstream side of the compressor and an EGR valve installed at the EGR line; a bypass line branched from the EGR line and joined to the intake manifold; and a bypass valve configured to operate according to an injection condition of fuel and be installed at the bypass line.

In a fuel-cut condition, the EGR valve and the bypass valve may be opened and the throttle valve is shut off, so that the exhaust gas flowing in the exhaust line may be supplied to the intake manifold along the EGR line and the bypass line.

The fuel-cut condition may be satisfied when a vehicle is coasting.

An EGR cooler cooling the exhaust gas may be installed at the EGR line.

According to the embodiments of the present disclosure, it is possible to improve purification efficiency of a catalyst by bypassing exhaust gas flowing into an exhaust gas purification apparatus.

BRIEF DESCRIPTION OF THE DRAWINGS

The drawings are provided for reference in describing exemplary embodiments of the present disclosure, and the spirit of the present disclosure should not be construed only by the accompanying drawings.

DETAILED DESCRIPTION OF THE EMBODIMENTS

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present disclosure.

To clearly describe the present disclosure, portions which do not relate to the description are omitted, and like reference numerals designate like elements throughout the specification.

Further, the size and thickness of each component shown in the drawings are arbitrarily shown for better understanding and ease of description, but the present disclosure is not limited thereto. In the drawings, the thickness of layers, films, panels, regions, etc., are exaggerated for clarity.

Hereinafter, an engine system according to an exemplary embodiment of the present disclosure will be described in detail with reference to the accompanying drawings.

Figure 1:
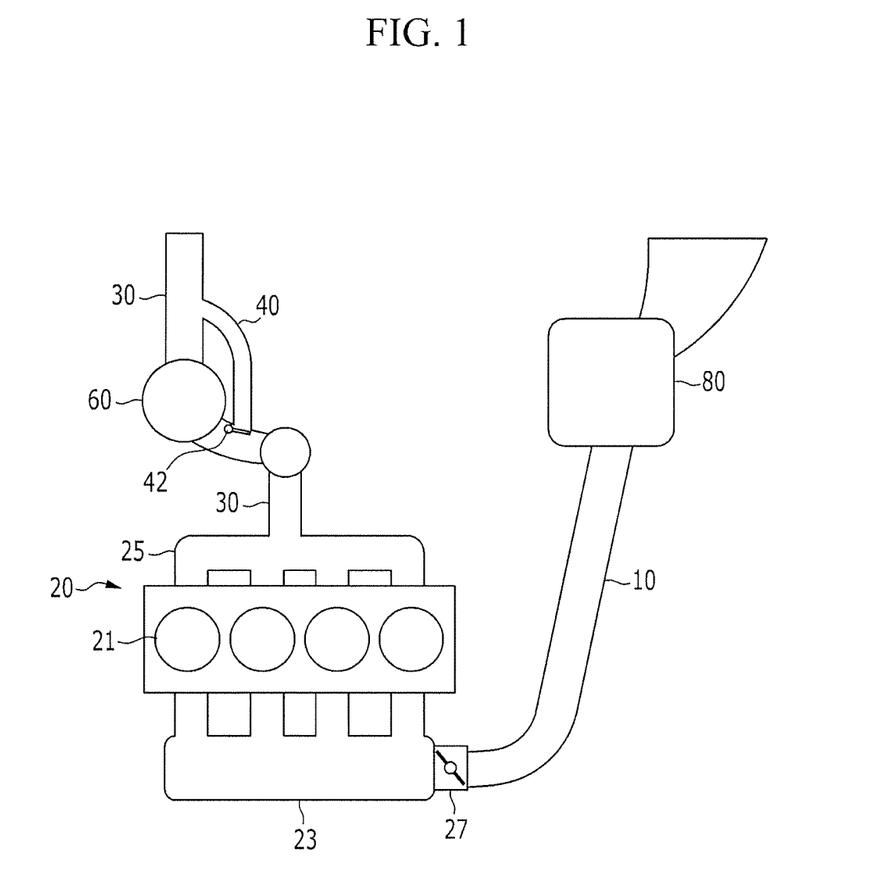
FIG. 1 illustrates a schematic view of an engine system according to a first exemplary embodiment of the present disclosure.

FIG. 1 illustrates a schematic view of an engine system according to a first exemplary embodiment of the present disclosure. The engine system shown in FIG. 1 corresponds to a naturally aspirated engine.

As shown in FIG. 1, the engine system according to the present disclosure includes an engine 20, an exhaust gas purification apparatus 60, a bypass line 40, and a bypass valve 42.

The engine 20 includes a plurality of combustion chambers 21 generating driving torque by combustion of fuel. The engine 20 is provided with an intake line 10 in which intake gas supplied to the combustion chambers 21 flows, and an exhaust line 30 in which exhaust gas exhausted from the combustion chambers 21 flows.

An intake manifold 23 for distributing intake air to the plurality of combustion chambers 21 is provided at an outlet of the intake line 10. An exhaust manifold 25 for collecting exhaust gas exhausted from the plurality of combustion chambers 21 into the exhaust line 30 is provided at an inlet of the exhaust line 30.

An air cleaner 80 for filtering outside air flowing in the intake line 10 is provided at the intake line 10.

A throttle valve 27 for adjusting an amount of intake air supplied to the intake manifold 23 is provided at a point at which the intake line 10 meets the intake manifold 23. The throttle valve 27 is operated by a control signal of a controller such as an engine control unit (ECU) provided in the vehicle, so that the amount of intake air supplied to the intake manifold 23 is adjusted.

The exhaust gas purification apparatus 60 is provided at the exhaust line 30, and it purifies various harmful substances contained the exhaust gas exhausted from the combustion chamber 21. The exhaust gas purification apparatus 60 may include a three-way catalyst for purifying nitrogen oxide. The three-way catalyst is one which simultaneously reacts with carbon monoxide, nitrogen oxides, and a hydrocarbon-based compound which are harmful components of exhaust gas to eliminate them, and it may be mainly made of Pd alone, Pt/Rh, Pd/Rh, or Pt/Pd/Rh.

The bypass line 40 is branched from the exhaust line 30 at an upstream side of the exhaust gas purification apparatus 60 so that the exhaust gas flowing in the exhaust line 30 bypasses the exhaust gas purification apparatus 60, and is joined to the exhaust line 30 at a downstream side of the exhaust gas purification apparatus 60.

The bypass valve 42 is configured to operate depending on an injection condition of fuel and be installed at the bypass line 40, and the exhaust gas flowing in the exhaust line 30 selectively bypasses the exhaust gas purification apparatus 60 depending on opening or closing of the bypass valve 42.

The bypass valve 42 is operated by a control signal of a controller such as an engine control unit (ECU) provided in the vehicle to selectively block the bypass line 40. The controller may include at least one microprocessor which executes a predetermined program.

Figure 2:
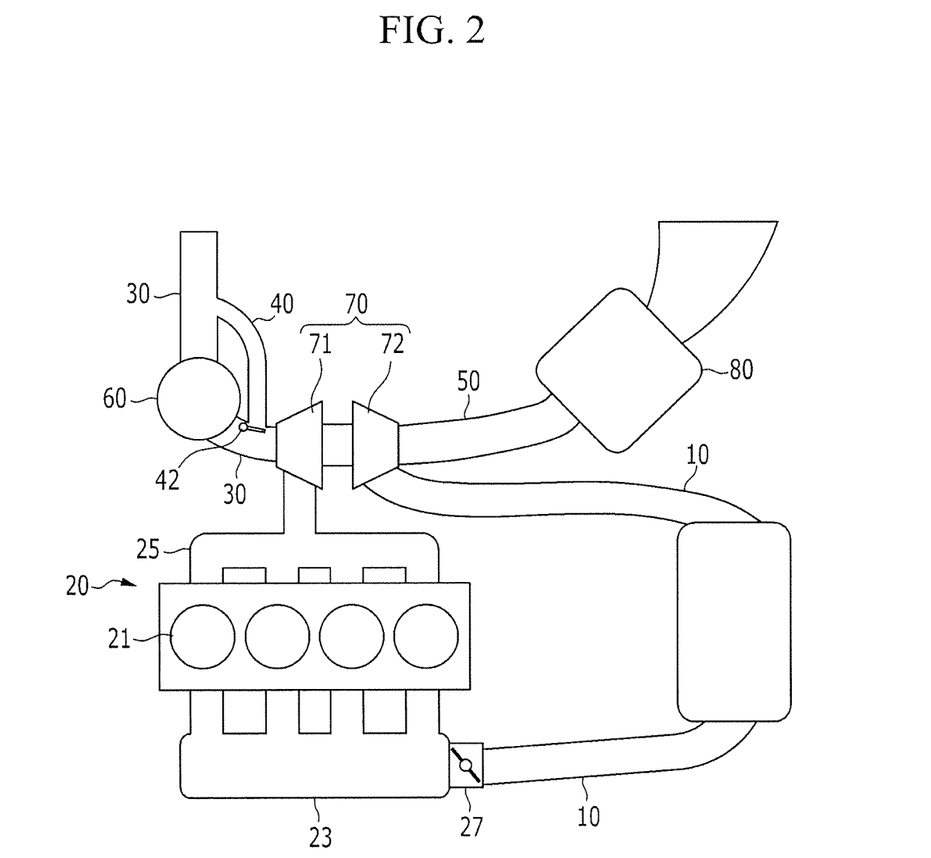
FIG. 2 illustrates a schematic view of an engine system according to a second exemplary embodiment of the present disclosure.

FIG. 2 illustrates a schematic view of an engine system according to a second exemplary embodiment of the present disclosure. FIG. 2 illustrates an engine system according to a second exemplary embodiment of the present disclosure in which a turbocharger is included in that according to the first exemplary embodiment shown in FIG. 1, so detailed description for the same constituent elements will be omitted.

Referring to FIG. 2, the engine system according to the second exemplary embodiment of the present disclosure further includes a turbocharger 70 for supplying compressed air to the combustion chamber 21 of the engine 20.

The turbocharger 70 compresses intake gas (outside air) flowing through the intake line 10 to supply it to the combustion chamber 21. The turbocharger 70 is provided at the exhaust line 30, and includes a turbine 71 rotated by the exhaust gas exhausted from the combustion chamber 21 and a compressor 72 rotating together with the turbine 71 and compressing the intake gas.

In this case, the bypass line 40 is branched from the exhaust line 30 between the exhaust gas purification apparatus 60 and the turbine 71, and is joined to the exhaust line 30 at a downstream side of the exhaust gas purification apparatus 60.

The bypass valve 42 is configured to operate depending on an injection condition of fuel and be installed at the bypass line 40, and the exhaust gas flowing in the exhaust line 30 selectively bypasses the exhaust gas purification apparatus 60 depending on opening or closing of the bypass valve 42.

According to the first and second exemplary embodiments of the present disclosure, while the vehicle is not in a coasting state but is in a normal running state, the bypass valve 42 is shut off, and the exhaust gas exhausted from the combustion chamber 21 flows through the exhaust line 30 and the exhaust gas purification apparatus 60 and then is discharged to the outside.

However, the bypass valve 42 is opened under the fuel-cut condition, and the exhaust gas flowing in the exhaust line 30 bypasses the exhaust gas purification apparatus 60. In this case, the fuel-cut condition may mean a coasting state of the vehicle.

As described above, the bypass valve 42 is opened under the fuel-cut condition, and the exhaust gas bypasses the exhaust gas purification apparatus 60, thus it is possible to prevent oxygen from being intercalated in the catalyst of the exhaust gas purification apparatus 60, thereby improving the purification efficiency of the exhaust gas by the catalyst.

Figure 3:
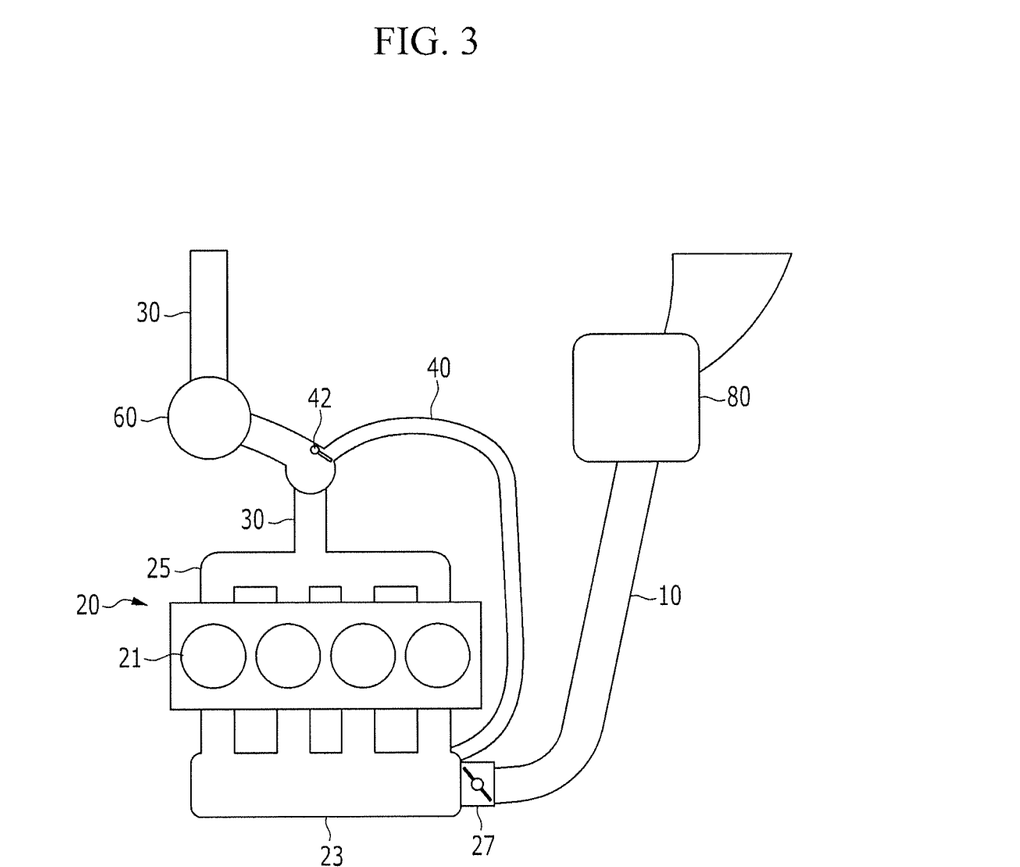
FIG. 3 illustrates a schematic view of an engine system according to a third exemplary embodiment of the present disclosure.

FIG. 3 illustrates a schematic view of an engine system according to a third exemplary embodiment of the present disclosure. A configuration of the third exemplary embodiment of the present disclosure shown in FIG. 3 is different in only the bypass line 40 of the first exemplary embodiment of the present disclosure. Accordingly, only a different configuration from that of the first exemplary embodiment is described in detail.

Referring to FIG. 3, the bypass line 40 is branched from the exhaust line 30 at an upstream side of the exhaust gas purification apparatus 60 and joined to the intake manifold 23 so that the exhaust gas flowing in the exhaust line 30 bypasses the exhaust gas purification apparatus 60.

The bypass valve 42 is configured to operate depending on an injection condition of fuel and be installed at the bypass line 40, and the exhaust gas flowing in the exhaust line 30 selectively flows to the intake manifold 23 depending on opening or closing of the bypass valve 42.

Figure 4:
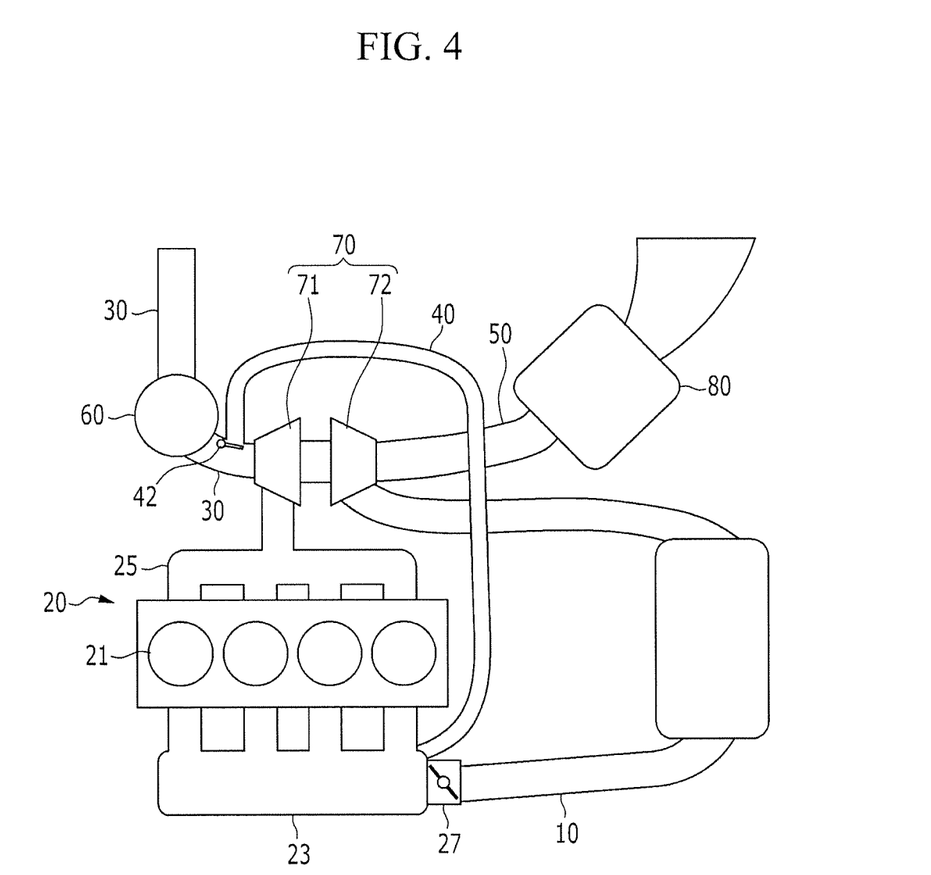
FIG. 4 illustrates a schematic view of an engine system according to a fourth exemplary embodiment of the present disclosure.

FIG. 4 illustrates a schematic view of an engine system according to a fourth exemplary embodiment of the present disclosure. FIG. 4 illustrates an engine system according to the fourth exemplary embodiment of the present disclosure in which a turbocharger is included in that according to the third exemplary embodiment shown in FIG. 3, so detailed description for the same constituent elements will be omitted.

Referring to FIG. 4, an engine system according to the fourth exemplary embodiment of the present disclosure further includes the turbocharger 70 for supplying compressed air to the combustion chamber 21 of the engine 20.

The turbocharger 70 compresses intake gas (outside air) flowing through the intake line 10 to supply it to the combustion chamber 21. The turbocharger 70 is provided at the exhaust line 30, and includes a turbine 71 rotated by the exhaust gas exhausted from the combustion chamber 21 and a compressor 72 rotating together with the turbine 71 and compressing the intake gas.

In this case, the bypass line 40 is branched from the exhaust line 30 between the exhaust gas purification apparatus 60 and the turbine 71, and is joined to the intake manifold 23.

The bypass valve 42 is configured to operate depending on an injection condition of fuel and be installed at the bypass line 40, and the exhaust gas flowing in the exhaust line 30 selectively flows to the intake manifold 23 depending on opening or closing of the bypass valve 42.

According to the third and fourth exemplary embodiments of the present disclosure, while the vehicle is not in a coasting state but is in a normal running state, the bypass valve 42 is shut off, and the exhaust gas exhausted from the combustion chamber 21 flows through the exhaust line 30 and the exhaust gas purification apparatus 60 and then is discharged to the outside.

However, the bypass valve 42 is opened under the fuel-cut condition, and the exhaust gas exhausted from the combustion chamber 21 flows to the intake manifold 23 without passing through the exhaust gas purification apparatus 60. In this case, the fuel-cut condition may mean a coasting state of the vehicle.

As described above, since the bypass valve 42 is opened under the fuel-cut condition, and the exhaust gas flows to the intake manifold 23 without passing through the exhaust gas purification apparatus 60, it is possible to prevent oxygen from being intercalated in the catalyst of the exhaust gas purification apparatus 60, thereby improving the purification efficiency of the exhaust gas by the catalyst.

Figure 5:
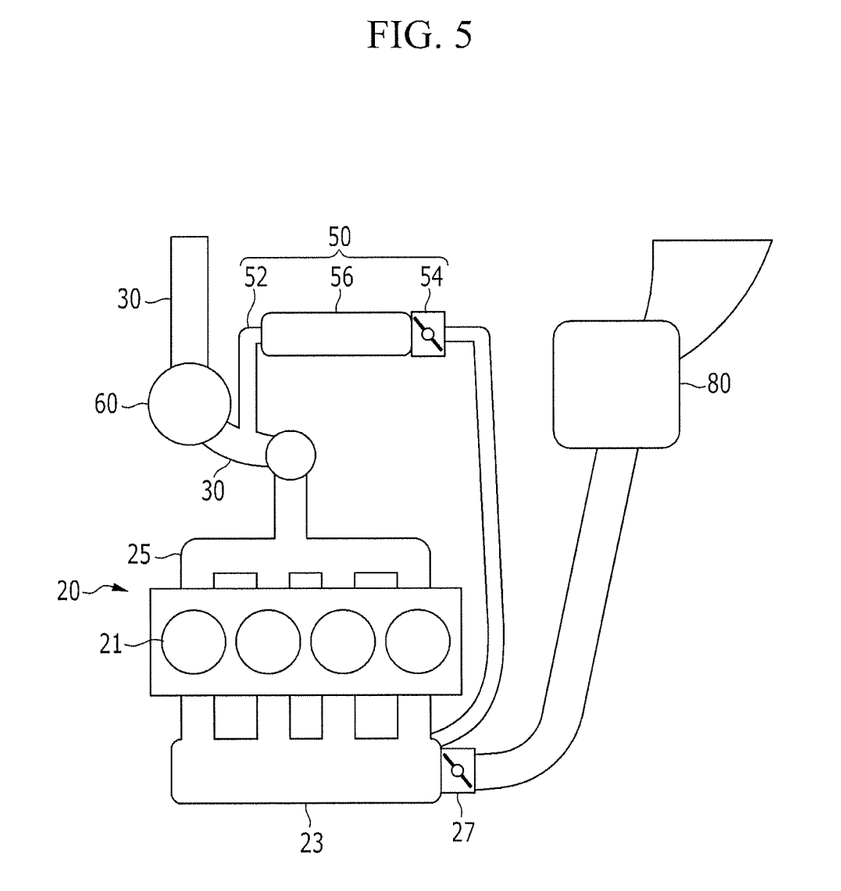
FIG. 5 illustrates a schematic view of an engine system according to a fifth exemplary embodiment of the present disclosure.

FIG. 5 illustrates a schematic view of an engine system according to a fifth exemplary embodiment of the present disclosure. FIG. 5 illustrates an engine system according to the fifth exemplary embodiment of the present disclosure in which an exhaust gas recirculation apparatus is included in that according to the first exemplary embodiment shown in FIG. 1, so detailed description for the same constituent elements will be omitted.

Referring to FIG. 5, the engine system according to the fifth exemplary embodiment of the present disclosure further includes an exhaust gas recirculation apparatus 50. The exhaust gas recirculation apparatus 50 again mixes some (e.g., 5-20%) of the exhaust gas exhausted from the engine with a mixed gas to reduce an amount of oxygen of the mixed gas and disturb combustion, thereby suppressing generation of NOx.

In the fifth exemplary embodiment of the present disclosure, an example in which the exhaust gas recirculation apparatus 50 is a low pressure exhaust gas recirculation (EGR) apparatus will be described.

The exhaust gas recirculation apparatus 50 includes an EGR line 52, an EGR cooler 56, and an EGR valve 54.

The EGR line 52 is branched from the exhaust line 30 at an upstream side of the exhaust gas purification apparatus 60 and joined to the intake manifold 23. The EGR cooler 56 is disposed at the EGR line 52, and cools exhaust gas flowing in the EGR line 52. The EGR valve 54 is installed at the EGR line 52, and adjusts an amount of the exhaust gas flowing into the intake line 10. Here, the exhaust gas supplied to the intake line 10 through the low pressure EGR line 52 is referred to as a recirculation gas.

According to the engine system of the fifth exemplary embodiment of the present disclosure, the exhaust gas bypasses the exhaust gas purification apparatus 60 through the EGR line 52 and the EGR valve 54 without the separate bypass line 40 and the separate bypass valve 42 provided in the first to fourth exemplary embodiments of the present disclosure.

That is, while the vehicle is not in a coasting state but is in a normal running state, the exhaust gas exhausted from the combustion chamber 21 flows through the exhaust line 30 and the exhaust gas purification apparatus 60 and then is discharged to the outside. In addition, as necessary, some of the exhaust gas is supplied to the combustion chamber 21 through the EGR line 52 then the intake manifold 23.

However, the EGR valve 54 is opened to a maximum in a fuel cut condition, and the throttle valve 27 is shut off, thus the exhaust line 30, the EGR line 52, the intake manifold 23, and the exhaust manifold 25 form a closed circuit for circulation of the exhaust gas. In this case, the exhaust gas flows to the intake manifold 23 through the EGR line 52 mostly without passing through the exhaust gas purification apparatus 60 due to a negative pressure generated by an operation of the engine.

As described above, the EGR valve 54 is opened to a maximum in the fuel cut condition, and the throttle valve 27 is shut off, thus the exhaust gas mostly does not pass through the exhaust gas purification apparatus 60, and accordingly, it is possible to prevent oxygen from being intercalated in the catalyst of the exhaust gas purification apparatus 60 and improve the purification efficiency of the exhaust gas by the catalyst.

In addition, since it is possible to bypass the exhaust gas through the EGR line 52, it is not necessary to install a separate bypass line 40 at the inside of an engine compartment, thus a layout of the inside of the engine compartment may be simplified, and a manufacturing cost of the vehicle may be reduced.

Figure 6:
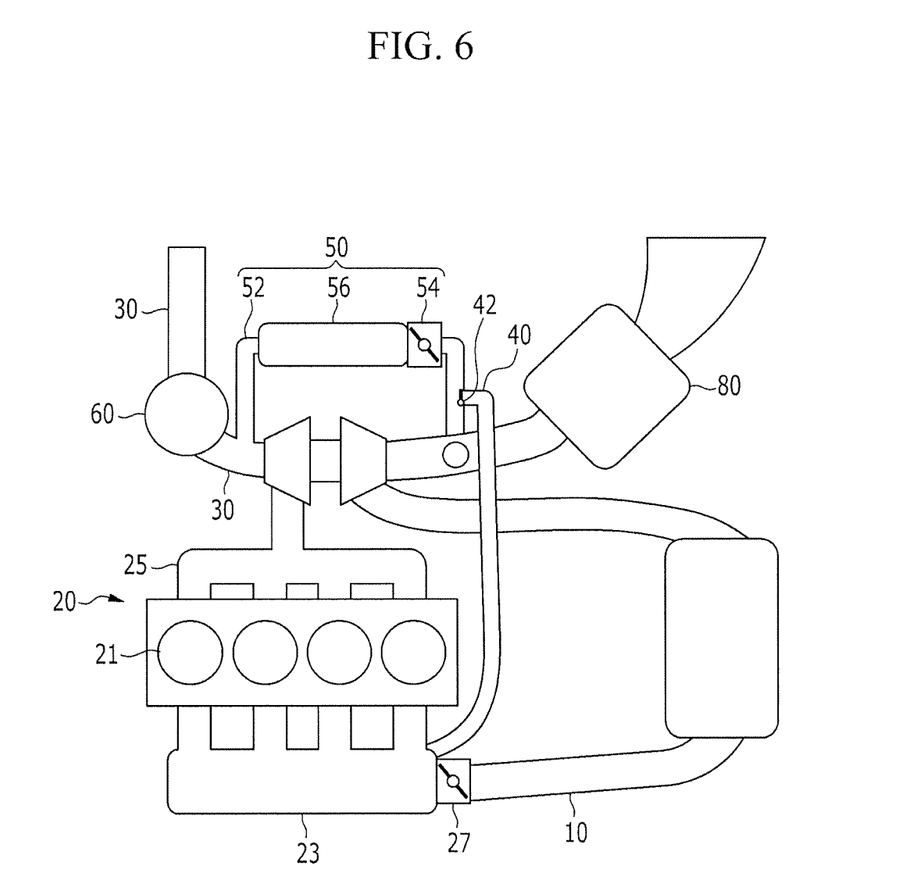
FIG. 6 illustrates a schematic view of an engine system according to a sixth exemplary embodiment of the present disclosure.

FIG. 6 illustrates a schematic view of an engine system according to a sixth exemplary embodiment of the present disclosure. FIG. 6 illustrates an engine system according to the sixth exemplary embodiment of the present disclosure in which a turbocharger is included in that according to the fifth exemplary embodiment shown in FIG. 5, so detailed description for the same constituent elements will be omitted.

Referring to FIG. 6, the engine system according to the sixth exemplary embodiment of the present disclosure further includes the turbocharger 70 for supplying compressed air to the combustion chamber 21 of the engine 20.

The turbocharger 70 compresses intake gas (outside air) flowing through the intake line 10 to supply it to the combustion chamber 21. The turbocharger 70 is provided at the exhaust line 30, and includes a turbine 71 rotated by the exhaust gas exhausted from the combustion chamber 21 and a compressor 72 rotating together with the turbine 71 and compressing the intake gas.

In this case, the EGR line 52 is branched from the exhaust line 30 between the exhaust gas purification apparatus 60 and the turbine 71, and is joined to the intake line 10 at an upstream side of the compressor 72.

The engine system according to the sixth exemplary embodiment of the present disclosure further includes the bypass line 40 branched from the EGR line 52 and joined to the intake manifold 23. The bypass valve 42 is configured to operate depending on an injection condition of fuel and be installed at the bypass line 40, and the exhaust gas flowing in the exhaust line 30 and the EGR line 52 selectively flows to the intake manifold 23 depending on opening or closing of the bypass valve 42.

According to the sixth exemplary embodiment of the present disclosure, while the vehicle is not in a coasting state but is in a normal running state, the bypass valve 42 is shut off, and the exhaust gas exhausted from the combustion chamber 21 flows through the exhaust line 30 and the exhaust gas purification apparatus 60 and then is discharged to the outside. In addition, as necessary, some of the exhaust gas is supplied to the combustion chamber 21 through the EGR line 52 then the intake manifold 23.

However, the EGR valve 54 and the bypass valve 42 are opened to a maximum in a fuel cut condition, and the throttle valve 27 is shut off, thus the exhaust line 30, the EGR line 52, the bypass line 40, the intake manifold 23, and the exhaust manifold 25 form a closed circuit for circulation of the exhaust gas. In this case, the exhaust gas flows to the intake manifold 23 through the EGR line 52 mostly without passing through the exhaust gas purification apparatus 60 due to a negative pressure generated by an operation of the engine.

As described above, the EGR valve 54 and the bypass valve 42 are opened to a maximum in the fuel cut condition, and the throttle valve 27 is shut off, thus the exhaust gas mostly does not pass through the exhaust gas purification apparatus 60, and accordingly, it is possible to prevent oxygen from being intercalated in the catalyst of the exhaust gas purification apparatus 60 and improve the purification efficiency of the exhaust gas by the catalyst.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An engine system comprising:
   an engine including a plurality of combustion chambers generating driving torque by combustion of fuel;
   an intake manifold distributing intake air supplied from an intake line to the plurality of combustion chambers;
   a throttle valve installed at an upstream side of the intake manifold to adjust an amount of air supplied to the intake manifold;

an exhaust gas purification apparatus installed at an exhaust line in which exhaust gas exhausted from the combustion chambers flows;
a turbocharger including:
- a turbine disposed at the exhaust line at an upstream side of the exhaust gas purification apparatus, the turbine rotating by the exhaust gas; and
- a compressor disposed at an intake line and rotating together with the turbine;

an exhaust gas recirculation apparatus including an EGR line branched from the exhaust line between the exhaust gas purification apparatus and the turbine, the EGR line joining the intake line at an upstream side of the compressor and an EGR valve installed at the EGR line;
a bypass line branched from the EGR line and joined to the intake manifold at a downstream side of the throttle valve; and
a bypass valve disposed at the bypass line; and
an electronic control unit (ECU) configured to operate the throttle valve and the bypass valve,
wherein, in a fuel-cut condition, the throttle valve is closed while the bypass valve is opened by the ECU so that the exhaust gas flows from the upstream side of the exhaust gas purification apparatus to the intake manifold.

2. The engine system of claim 1, wherein in the fuel-cut condition,
the exhaust gas flowing in the exhaust line is supplied to the intake manifold along the EGR line and the bypass line.

3. The engine system of claim 2, wherein the fuel-cut condition is satisfied when a vehicle is coasting.

4. The engine system of claim 1, wherein an EGR cooler cooling the exhaust gas is installed at the EGR line.

* * * * *